(No Model.)
J. F. GOODRICH.
JUMP SEAT CARRIAGE.
No. 427,856. Patented May 13, 1890.
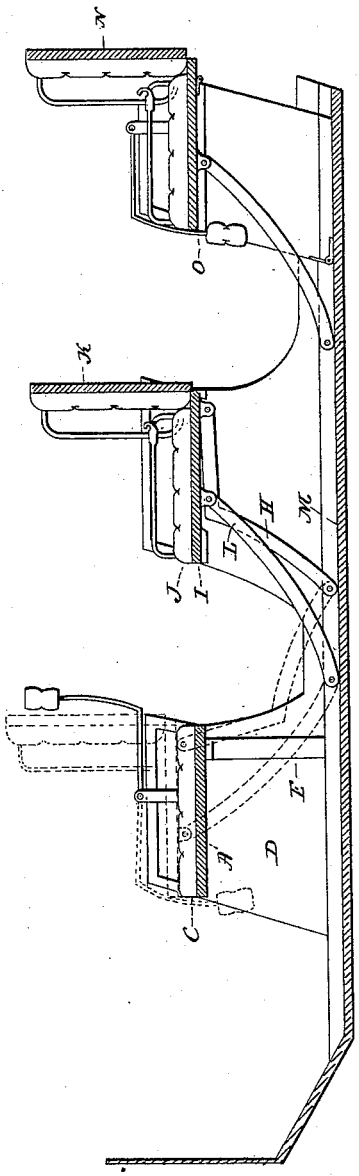
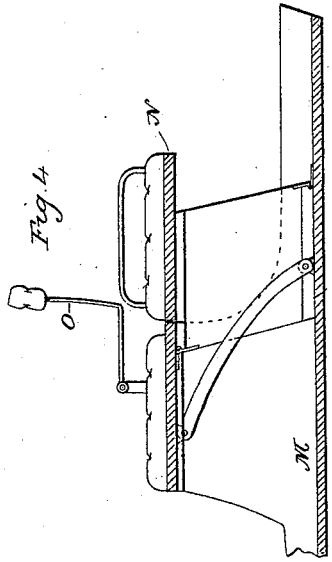
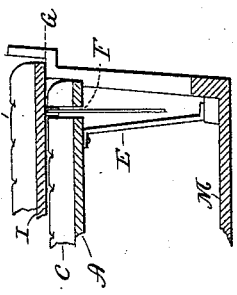
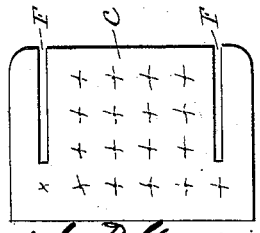

UNITED STATES PATENT OFFICE.

JOSEPH F. GOODRICH, OF NEW HAVEN, CONNECTICUT.

JUMP-SEAT CARRIAGE.

SPECIFICATION forming part of Letters Patent No. 427,856, dated May 13, 1890.

Application filed February 19, 1890. Serial No. 341,029. (No model.)

*To all whom it may concern:*

Be it known that I, JOSEPH F. GOODRICH, of New Haven, in the county of New Haven and State of Connecticut, have invented a new Improvement in Jump-Seat Carriages; and I do hereby declare the following, when taken in connection with accompanying drawings and the letters of reference marked thereon, to be a full, clear, and exact description of the same, and which said drawings constitute part of this specification, and represent, in—

Figure 1, a view in vertical longitudinal section of a carriage embodying my invention; Fig. 2, a detached plan view of the cushion of the stationary seat. Fig. 3 is a broken view, partly in section and partly in front elevation, of one end of the stationary seat; and Fig. 4 is a detached sectional view showing the rear jump-seat jumped over upon the forward jump-seat and having its hinged back turned down and its lazy-back turned up.

My invention relates to an improvement in jump-seat carriages, the object being to make them more convenient and to give them a wider range of conversion than as now made.

With these ends in view my invention consists in a seat adapted to have a jump-seat jumped onto it without removing its cushion, in a jump-seat having a hinged back and a lazy-back, and in certain details of construction and combinations of parts, as will be hereinafter described, and pointed out in the claims.

As herein shown, my invention is applied to a vehicle having a stationary front seat and a forward and a rear jump-seat. The said stationary seat has a seat-board A, provided with a fixed cushion C, and supported at its ends by casings D and at its rear edge by two braces E, which are located between two long parallel slots F F, extending inward from the rear edges of the seat-board and cushion. Each of the said casings D D is provided at its upper end with a bearing G, located on or above the level of the upper face of the cushion.

By slotting the cushion as described, as well as the seat-board, which has been slotted before my present invention, it becomes unnecessary to remove the cushion when the jump-seat is jumped forward, as the forward levers H thereof enter the slots in the cushion, as shown by broken lines in Fig. 1 of the drawings and by full lines in Fig. 3 thereof. By providing the upper ends of the casings D D of the front seat with bearings for the ends of the jump-seat to rest upon the same is firmly supported and the cushion prevented from being crushed.

The jump-seat above referred to forms the forward of the two jump-seats herein shown, and consists of a seat-board I, a cushion J, a hinged back K, and two pairs of levers H and L, having their upper ends pivoted to its seat-board and their lower ends pivoted to the body M of the vehicle. The said jump-seat is not, however, in itself novel and does not need further description.

The second feature of my invention is shown in the rear jump-seat, which has not only a hinged back N, but also a lazy-back O, so that when the seat is jumped forward and its back turned down and supported in a horizontal position to form a seat, as shown by Fig. 4 of the drawings, the lazy-back may be brought into use, as also shown by that figure, to not only take the place of the hinged back, but also to form a back for the new seat formed by turning down the hinged back. The rear jump-seat is made, as shown, with two hinged frames P, which take the place of the levers L of the forward jump-seat, but are not new with me.

It is apparent that the two features of improvement above shown are not necessarily used together, although they combine to form a carriage of convenient and widely-varied conversion.

I would have it understood that I do not limit myself to the exact construction shown and described, but hold myself at liberty to make such changes and alterations as fairly fall within the spirit and scope of my invention.

Having now fully described my invention, what I claim, and desire to secure by Letters Patent, is—

1. In a jump-seat carriage, a seat having its cushion slotted inward from its rear edge and provided with bearings to support the jump-seat above the cushion, which is not removed, substantially as described.

2. In a jump-seat carriage, the combination, with a stationary seat having its cushion slotted from its rear edge inward and provided with bearings at each end, of a jump-seat adapted to be jumped over the said stationary seat and having levers entering the slots in the cushion and supported above the same by the said bearings, substantially as described.

3. In a three-seated carriage, the combination, with a fixed seat, of a forward jump-seat, a rear jump-seat having a hinged back and a lazy-back, and means for supporting the hinged back of the rear jump-seat in a horizontal position to form a seat, at which time the lazy-back is turned up to take its place, substantially as described.

JOSEPH F. GOODRICH.

Witnesses:
FRED C. EARLE,
LILLIAN D. KELSEY.